(12) United States Patent
Levy et al.

(10) Patent No.: US 11,840,244 B2
(45) Date of Patent: Dec. 12, 2023

(54) SYSTEM AND METHOD FOR DETECTING BEHAVIORAL ANOMALIES AMONG FLEETS OF CONNECTED VEHICLES

(71) Applicant: Upstream Security, Ltd., Herzliya (IL)

(72) Inventors: Yoav Levy, Kfar-Vitkin (IL); Yonatan Appel, Ramat Hasharon (IL); Amir Volfovich, Tel-Aviv (IL)

(73) Assignee: UPSTREAM SECURITY, LTD., Herzliya (IL)

( * ) Notice: Subject to any disclaimer, the term of this patent is extended or adjusted under 35 U.S.C. 154(b) by 579 days.

(21) Appl. No.: 16/230,003

(22) Filed: Dec. 21, 2018

(65) Prior Publication Data

US 2020/0198651 A1  Jun. 25, 2020

(51) Int. Cl.
*B60W 50/04* (2006.01)
*G05D 1/02* (2020.01)
*G06N 20/00* (2019.01)
*B60W 40/09* (2012.01)

(52) U.S. Cl.
CPC .......... *B60W 50/045* (2013.01); *B60W 40/09* (2013.01); *G05D 1/0293* (2013.01); *G06N 20/00* (2019.01); *B60W 2050/048* (2013.01); *G05D 2201/0213* (2013.01)

(58) Field of Classification Search
CPC ......... B60W 50/045; B60W 2050/046; B60W 2050/048; B60W 40/09; G06F 11/3013; G06F 11/28; H04L 63/1408; G06N 20/00; G05D 1/0293
See application file for complete search history.

(56) References Cited

U.S. PATENT DOCUMENTS

| | | | | |
|---|---|---|---|---|
| 8,903,593 | B1* | 12/2014 | Addepalli | H04L 43/0858 |
| | | | | 701/29.1 |
| 9,843,594 | B1* | 12/2017 | Evans | H04L 63/1425 |
| 10,289,404 | B2* | 5/2019 | Fox | G06F 8/654 |
| 10,587,639 | B2* | 3/2020 | Danielson | H04L 67/12 |
| 2011/0264318 | A1* | 10/2011 | Laforge | G07C 5/008 |
| | | | | 701/22 |
| 2014/0279868 | A1* | 9/2014 | Astorg | G06Q 30/02 |
| | | | | 707/609 |
| 2018/0324154 | A1* | 11/2018 | Crabtree | H04L 63/061 |
| 2018/0351980 | A1* | 12/2018 | Galula | H04W 12/12 |
| 2019/0382032 | A1* | 12/2019 | Yeung | G05D 1/0088 |

\* cited by examiner

*Primary Examiner* — Jeff A Burke
*Assistant Examiner* — Mohamad O El Sayah
(74) *Attorney, Agent, or Firm* — M&B IP Analysts, LLC (57) ABSTRACT

A system and method for detecting behavioral anomalies among a fleet including a plurality of connected vehicles. The method includes generating at least one fleet behavioral profile for the fleet using a first set of data, wherein creating each fleet behavioral profile includes training a machine learning model using at least a portion of the first set of data, wherein the at least a portion of the first set of data relates to communications with and among the plurality of connected vehicles; applying the at least one fleet behavioral profile to detect at least one anomaly in a second set of data for the fleet wherein the second set of data includes data related to communications with and among the plurality of connected vehicles; and performing at least one mitigation action when the at least one anomaly is detected.

21 Claims, 4 Drawing Sheets

SYSTEM AND METHOD FOR DETECTING BEHAVIORAL ANOMALIES AMONG FLEETS OF CONNECTED VEHICLES

TECHNICAL FIELD

The present disclosure relates generally to detecting behavioral anomalies for connected vehicles, and more specifically to detecting behavioral anomalies across groups of connected vehicles.

BACKGROUND

With advances in computer technology, computerized navigation and control systems in vehicles have been created to improve drivers' experiences and to allow for remotely controlled transportation of people and goods. These computerized car systems can provide guided or assisted driving, or autonomously control vehicles. To this end, computerized driving systems may have access to and control over critical vehicle functions such as, for example, unlocking the car, turning the engine on and off, controlling steering and braking, and the like. To aid in navigation and control, connected vehicles may be equipped with network access that allows the connected vehicles to communicate with each other and/or with remote control systems. These connected vehicles may be used for, e.g., tracking commercial cars (for example, buses, trucks, delivery/rental vehicles), navigating self-driving or assisted driving cars, car sharing services, robots, and the like. Gartner, Inc., forecasts that, by 2020, there will be at least 220 million connected cars on the road.

Connected vehicles, like other vehicles, may be organized in fleets of two or more vehicles. Connected vehicles in fleets may communicate with each other and/or with a centralized system configured to manage the fleet. The organization of connected vehicles into fleets allows for coordinating control of the connected vehicles based on one or more common control schemes. Specifically, a control scheme may apply to a single vehicle, a subset of vehicles, or to an entire set of vehicles.

While connected vehicles offer great opportunities for providing improved services to owners of vehicles, the communications used by connected vehicles leave those connected vehicles potentially vulnerable to cyber-attacks. This problem is compounded among fleets of connected vehicles, where infiltrating any of the connected vehicles may, in turn, provide hackers or other malicious entities with improper access to the entire fleet. Such cyber-attacks can cause significant harm in the form of delayed arrivals of the connected vehicles or, in more extreme cases, vehicular accidents that can result in harm to people and/or financial loss.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting behavioral anomalies among a fleet including a plurality of connected vehicles. The method comprises: generating at least one fleet behavioral profile for the fleet using a first set of data, wherein creating each fleet behavioral profile includes training a machine learning model using at least a portion of the first set of data, wherein the at least a portion of the first set of data relates to communications with and among the plurality of connected vehicles; applying the at least one fleet behavioral profile to detect at least one anomaly in a second set of data for the fleet wherein the second set of data includes data related to communications with and among the plurality of connected vehicles; and performing at least one mitigation action when the at least one anomaly is detected.

Certain embodiments disclosed herein also include a non-transitory computer readable medium having stored thereon causing a processing circuitry to execute a process, the process comprising: generating at least one fleet behavioral profile for the fleet using a first set of data, wherein creating each fleet behavioral profile includes training a machine learning model using at least a portion of the first set of data, wherein the at least a portion of the first set of data relates to communications with and among the plurality of connected vehicles; applying the at least one fleet behavioral profile to detect at least one anomaly in a second set of data for the fleet wherein the second set of data includes data related to communications with and among the plurality of connected vehicles; and performing at least one mitigation action when the at least one anomaly is detected.

Certain embodiments disclosed herein also include a system for detecting behavioral anomalies among a fleet including a plurality of connected vehicles. The system comprises: a processing circuitry; and a memory, the memory containing instructions that, when executed by the processing circuitry, configure the system to: generate at least one fleet behavioral profile for the fleet using a first set of data, wherein creating each fleet behavioral profile includes training a machine learning model using at least a portion of the first set of data, wherein the at least a portion of the first set of data relates to communications with and among the plurality of connected vehicles; apply the at least one fleet behavioral profile to detect at least one anomaly in a second set of data for the fleet wherein the second set of data includes data related to communications with and among the plurality of connected vehicles; and perform at least one mitigation action when the at least one anomaly is detected.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting behavioral anomalies among fleets of connected vehicles. The method includes a learning phase and an enforcement phase. During the learning phase, a behavioral profile for a connected vehicle fleet or portion thereof (i.e., a sub-fleet) is generated using machine learning based on fleet behavior over a training period. During the enforcement phase, behavior of the fleet or sub-fleet is monitored with respect to the behavioral profile to detect anomalous fleet behavior. Specifically, the behavioral profile is utilized to detect deviations from normal fleet behavior. When anomalous behavior is detected, mitigation actions may be triggered or performed. Such mitigation actions may include, but are not limited to, ceasing or limiting communications among connected vehicles, ceasing communications with specific connected vehicles or sub-fleets of connected vehicles, ignoring certain commands, sending a notification to a user of the system, and the like.

It is noted that various embodiments disclosed herein are based on properties that are unique to fleets of connected vehicles that demonstrate potentially malicious activity when abnormalities are detected. In particular, various disclosed embodiments utilize command and control data including commands sent with and among fleets of connected vehicles as well as internal vehicle telemetry data, server data, or both.

In particular, the disclosed embodiments utilize behavioral profiles with respect to learned behaviors of fleets of connected vehicles. The behavioral profiles may be based on quantities of certain parameters or combinations of parameters in discrete time periods, generally over time, or with respect to particular sub-fleets. The parameters that may be considered with respect to a fleet may include, but are not limited to, overall number of sensitive commands sent among connected vehicles in the fleet, overall number of events for the fleet, total number of commands sent to a single vehicle, numbers of vehicles in the fleet, number of commands of a specific type sent to vehicles in a fleet over a period of time, number of events received from a single vehicle, total number of error messages, and overall bandwidth usage.

The anomalies in fleet behavior may further include anomalous aggregated behavior among vehicles. The aggregated behaviors may include, but are not limited to, aggregation of similar or related anomalies in individual vehicle behavior detected based on communications and telemetry data collected from different vehicles in a fleet or sub-fleet, aggregation of similar or related anomalies in individual vehicle behavior detected based on communications and telemetry data collected from internal or external vehicle monitoring systems communicating, and aggregation of similar or related normal individual vehicle behavior that collectively represents an anomaly (e.g., all vehicles having their engines turned off after a firmware over the air update may be anomalous even though some of the vehicles having their engines turned off after such an update may be normal).

To this end, it has been identified that these fleet behaviors may indicate potential cyber-threats to connected vehicles in the fleet, to systems communicating with those connected vehicles, or both. Some example cyber-threats indicated by fleet behaviors include anomalies in sensitive events sent to a fleet server over a period of time indicating a potential cyber-attack on the server from compromised or infectious vehicles, anomalies in sensitive commands sent to a fleet over a period of time indicating a potential cyber-attack on the fleet from a compromised or infectious server, anomalies in events sent from a single vehicle to a fleet server over a period of time indicating a potential denial-of-service (DoS) attack on the server by a compromised or infectious vehicle, anomalies in commands sent to a single vehicle from a fleet server over a period of time indicating a potential cyber-attack on the vehicle from a compromised or infectious server, anomalies in the number of error messages sent to a fleet server over a period of time indicating a potentially compromised or infectious vehicle in the fleet, anomalies in message size of messages sent over a fleet network channel over a period of time indicating a potential DoS attack on the server, an anomalous command being sent to vehicles in the fleet (e.g., a hard right turn) indicating a potentially compromised server, and anomalies in numbers of error records relative to numbers of over-the-air (OTA) update commands among a sub-category of vehicles in the fleet indicating a potentially harmful OTA update causing anomalous behavior which may be caused by a compromised fleet server.

The disclosed embodiments may further be applied to autonomous. Specifically, such autonomous vehicles may be among the fleets of connected vehicles. Fleet or sub-fleet level anomalies related to fleets or sub-fleets in which the autonomous vehicles operate may be considered anomalies in operation of the autonomous vehicles.

The disclosed embodiments allow for identifying anomalous behavior across fleets and, therefore, detecting potential threats to the fleet in real-time as the connected vehicles operate. Further, since the behavioral profile is developed based on behaviors of the fleet, anomalous behaviors that would not be recognized based on individual vehicle behavior alone may be detected. Accordingly, the disclosed embodiments allow for quickly identifying potential fleet-wide threats before a large number of connected vehicles in the fleet or sub-fleet demonstrate anomalous behavior.

Figure 1:
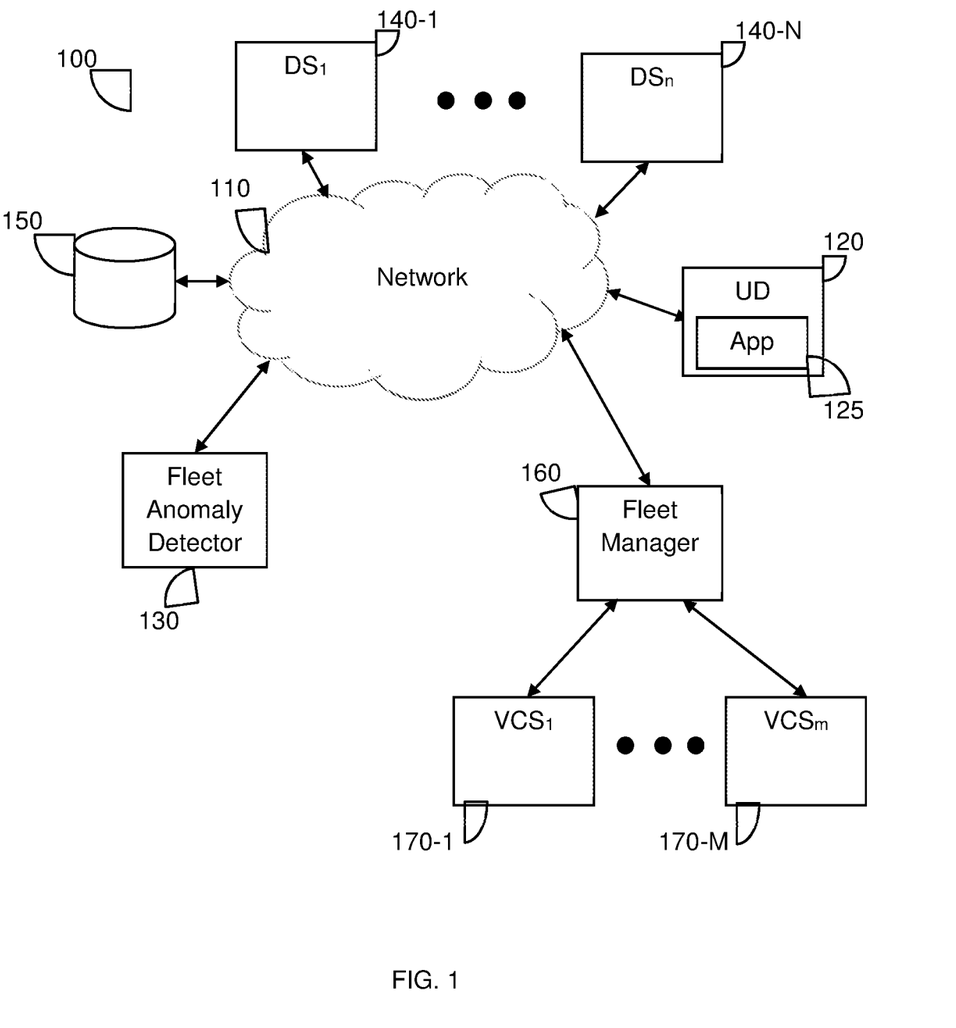
FIG. 1 is an example network diagram utilized to describe various disclosed embodiments.

FIG. 1 is an example network diagram 100 utilized to describe the various disclosed embodiments. The network diagram 100 includes a user device (UD) 120, a fleet anomaly detector 130, data sources (DSs) 140-1 through 140-N (hereinafter referred to individually as a data source 140 and collectively as data sources 140, merely for simplicity purposes) a database 150, a fleet manager 160, and vehicle control systems (VCSs) 170-1 through 170-M (hereinafter referred to individually as a vehicle control system 170 and collectively as vehicle control systems 170, merely for simplicity purposes) communicatively connected via a network 110. The network 110 may be, but is not limited to, the Internet, the world-wide-web (WWW), a wide area network (WAN), a metro area network (MAN), and other networks capable of enabling communication between the elements of the network diagram 100.

The user device 120 may be, but is not limited to, a personal computer (PC), a personal digital assistant (PDA), a mobile phone, a smart phone, a tablet computer, a wearable computing device and other kinds of wired and mobile appliances, equipped with communication capabilities that are enabled as further discussed herein below. The user device 120 may have installed thereon an application (App) 125. The application 125 may be configured to receive inputs from a user indicating commands to be executed by the fleet manager 160 or by one or more of the vehicle control systems 170, and to send the commands to the fleet anomaly detector 130 via the security agent 140.

Anomalies may be detected based on communications among the VCSs 170, the fleet manager 160, and the user device 120. Trends in types and volume of events based on these communications may be learned over time, over discrete periods of time, or both, and utilized to detect potential cyber-threats to the fleet. Further, communications among these entities may be organized as a sequence of events and sequentially analyzed with respect to learned sequences of events.

In an embodiment, the fleet anomaly detector 130 is deployed in a datacenter (not shown). Accordingly, the connected vehicles controlled by the vehicle control systems 170 may be secured from the datacenter. Alternatively, the fleet anomaly detector 130 may be deployed in a cloud computing platform (not shown) such as a public cloud, a private cloud, or a hybrid cloud.

Each of the vehicle control systems 170 is deployed with respect to a connected vehicle (not shown) and may be configured to control at least partially automated vehicle actions, to collect data from the respective connected vehicle, or both. A connected vehicle is configured to receive and send data (e.g., over the network 110), and may be further configured to implement commands in the received data (for example, a "Start_Engine" command). To this end, a connected vehicle includes computer components such as, but not limited to, a processing circuitry, a memory, a network interface, and the like. A connected vehicle may be, but is not limited to, a car, a bus, a truck, and the like. The connected vehicles may be at least partially controlled remotely.

The fleet manager 160 is configured to manage processes and tasks related to a fleet of connected vehicles (not shown) and may further be configured to at least partially control driving of the connected vehicles via the respective vehicle control systems 170. To this end, the fleet manager 160 may be an application server or a control server. The application server may include logic of an application program for managing individual controlled vehicles or fleets of controlled vehicles such as, but not limited to, the Local Motion fleet management app by Zipcar®, the UberFLEET app by Uber, and the like. The fleet manager 160 may be communicatively connected to the vehicle control systems 170 via one or more networks (not shown) such as the Internet, a local area network (LAN), and the like.

Figure 4:
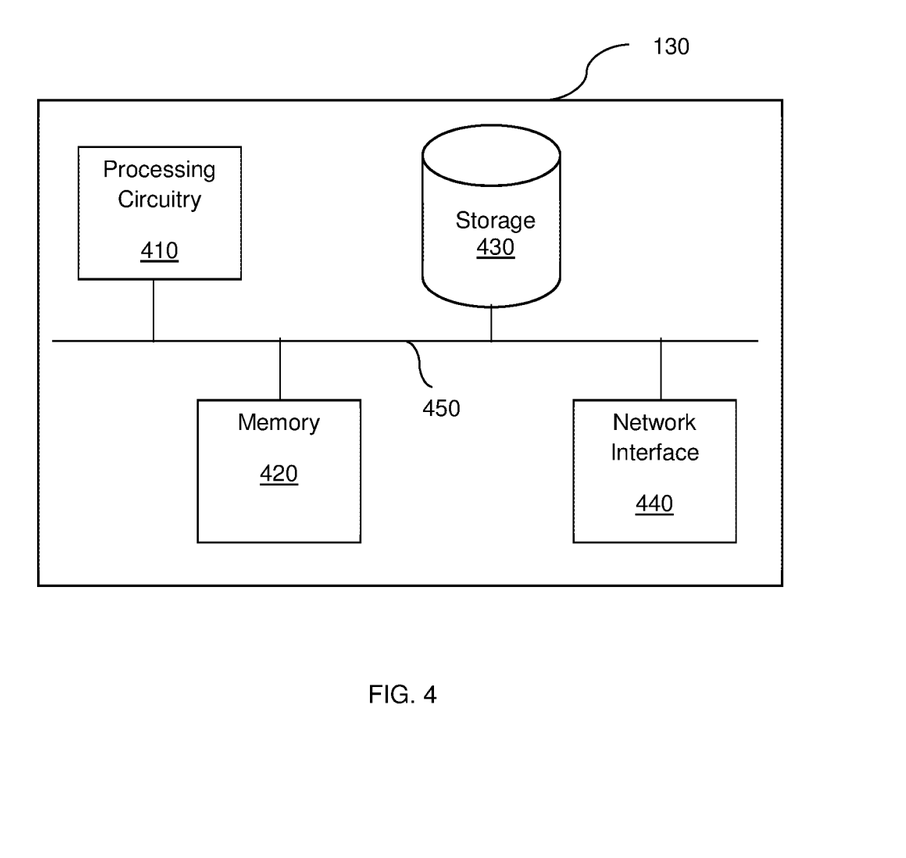
FIG. 4 is an example schematic diagram of a fleet anomaly detector according to an embodiment.

In an embodiment, the fleet anomaly detector 130 includes a processing circuitry coupled to a memory (e.g., the processing circuitry 410 and the memory 420 as shown in FIG. 4). The memory contains instructions that can be executed by the processing circuitry. The instructions, when executed by the processing circuitry, configure the fleet anomaly detector 130 to secure fleets of connected vehicles against cyber-attacks by detecting anomalous fleet behavior and causing mitigation actions as described herein.

In an embodiment, the fleet anomaly detector 130 is configured to collect vehicle data from the data sources 140, the fleet manager 160, or both. To this end, the data sources 170 store connected vehicle data such as, but not limited to, events, vehicle states, data traffic, telemetry data (e.g., Controller Area Network messages, sensor readings collected by sensors of a car, etc.), over-the-air (OTA) updates, log analytics, Lidar data, radar data, images, videos, and the like. The data stored in the data sources 170 may be from fleet managers, vehicle control systems, traffic control systems, and other systems configured to monitor and collect data related to vehicle or fleet behavior. Specifically, data from multiple different sources of information may be collected and utilized to detect anomalies. The fleet anomaly detector 130 may be configured to normalize the collected vehicle data.

Based on the connected vehicle data for the fleet, the fleet anomaly detector 130 may be configured to abstract the data by determining at least one vehicle data abstraction. Each vehicle data abstraction is a representation of a portion of the vehicle data including only data utilized for anomaly detection. As non-limiting examples, abstractions for vehicle data may include, but are not limited to, time, direction (e.g., vehicle to server or server to vehicle), client identifier (ID), driver ID, application, server ID, request type, server response status, violation type, violation name, OTA update ID, OTA update name, OTA update distribution time, client distribution time, vehicle location, speed, gear position, odometer value, acceleration, engine speed, engine state, wheel position, telematics, server commands, vehicle message identifier, vehicle engine control unit (ECU) data, vehicle diagnostic trouble codes (DTCs), and the like. Abstracting the vehicle data allows for more efficient processing and anomaly detection.

The fleet anomaly detector 130 is configured to aggregate the abstracted data. Based on the aggregated data, the fleet anomaly detector 130 is configured to create models of normal fleet behavior. Each model may be created via supervised or unsupervised machine learning using the collected vehicle data as inputs. The models may be with respect to the fleet, one or more sub-fleets, or both. Each sub-fleet is a grouping of vehicles among a fleet, and may include, e.g., all vehicles matching a common condition. For example, a sub-fleet may include vehicles at or near a geographical location (e.g., within 100 miles of the geographical location), vehicles connected to the same local area network, vehicles of a specific make or model, vehicles of a specific year, vehicles adhering to a predefined condition, a combination thereof, and the like.

Sub-fleets may be permanent sub-fleets that are predetermined, or may be created ad-hoc, for example as vehicles move from one location to another. Ad-hoc creation of sub-fleets allows for dynamic grouping of vehicles that are more likely to exhibit similar behavior or deviations from behavior, thereby allowing for more accurate anomaly detection. Further, the models do not need to be mutually exclusive. For example, a model for multiple groups that are overlapping may be created.

In an embodiment, models may be created with respect to different levels of a hierarchy of vehicles within a fleet (e.g., the entire fleet, one or more sub-fleets, further subdivisions of the fleet, one or more individual vehicles, etc.). Modeling vehicle behavior at different hierarchical levels allows for more accurate anomaly detection and classification, and may further allow for root cause determination for anomalies. As a non-limiting example, anomalies detected for multiple vehicles of a sub-fleet that are connected to the same local area network may indicate a cyber-attack affecting vehicle control systems connected to that local area network.

Using the normal behavior models and the events received from the fleet manager 160, the VCSs 170, or both, the fleet anomaly detector 130 is configured to detect, in real-time or in batches, behavioral anomalies. The fleet anomaly detector 130 may be configured to cluster the detected anomalies and to correlate the clusters to determine a root cause of the anomalies. The determined root cause may include cyber threats such as, but is not limited to, cyber-attacks (e.g., Denial-of-Service attacks), infected vehicles or servers, malicious or faulty over the air (OTA) updates, a combination thereof, and the like. The correlation may further be among clusters generated for different levels of a hierarchy of a fleet, thereby allowing for identification of a particular sub-fleet and correlation indicating the root cause of the anomalies.

When the determined root cause is a cyber threat, the fleet anomaly detector 130 may be configured to cause, in real-time, implementation of at least one mitigation action for mitigating the cyber threat. The fleet anomaly detector 130 may be configured to send instructions for implementing the mitigation actions to the fleet manager 160, to any of the vehicle control systems 170, to a server used for providing connected vehicle services (e.g., a server of a traffic control service), among the data sources 140, and the like.

It should be noted that only one fleet manager 160 and one set of vehicle control systems 170 are described herein with respect to FIG. 1 merely for simplicity purposes and without limitation on the disclosed embodiments. Multiple fleet managers, groups of vehicle control systems, individual vehicle control systems, or combinations thereof, may be secured in accordance with the disclosed embodiments. Each fleet may be protected based on a learned fleet behavioral model for that fleet.

It should be further noted that only one user device 120 and one application 125 are described herein above with reference to FIG. 1 merely for the sake of simplicity and without limitation on the disclosed embodiments. Multiple user devices may provide requests for commands to be executed by the vehicles control systems 170 without departing from the scope of the disclosure. Further, requests may be received from servers or other systems without departing from the scope of the disclosure.

It should also be noted that various embodiments are described with respect to a fleet manager 160 merely for example purposes and without limitation on the disclosed embodiments. Fleet behavioral data may be received from the vehicle control systems 170 directly (i.e., instead of through a fleet manager). Further, at least some functions (e.g., determining and sending commands to the vehicle control systems 170) that would be performed by a fleet manager may instead be performed by the fleet anomaly detector 130 without departing from the scope of the disclosure. An example network diagram illustrating an implementation without a fleet manager is described further in U.S. patent application Ser. No. 16/047,444, assigned to the common assignee, the contents of which are hereby incorporated by reference.

Figure 2:
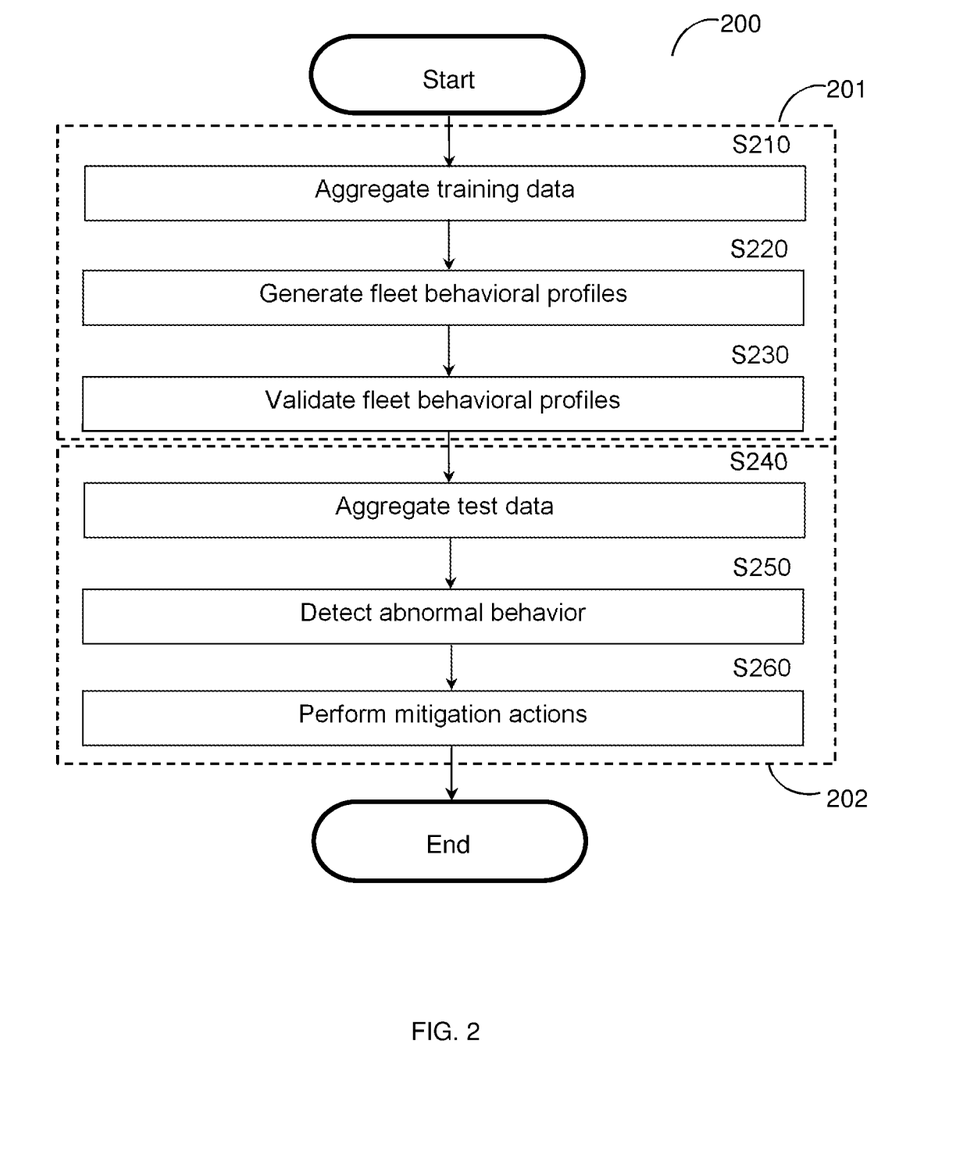
FIG. 2 is a flowchart illustrating a method for detecting behavioral anomalies among a fleet of connected vehicles according to an embodiment.

FIG. 2 is an example flowchart 200 illustrating a method for detecting behavioral anomalies among a fleet of connected vehicles according to an embodiment. In an embodiment, the method is performed by the fleet anomaly detector 130, FIG. 1.

The method generally includes a learning phase 201 and an enforcement phase 202 It should be noted that the learning may be continuous and may continue through the enforcement phase 202 without departing from the scope of the disclosed embodiments. Specifically, a fleet behavioral profile may be updated in real-time during the enforcement phase 202, and the enforcement may continue using the updated fleet behavioral profile.

At S210, the training data is aggregated. The training data is collected over a period of time and may be collected from sources such as, but not limited to, a fleet manager, one or more vehicle control systems, or one or more other data sources. At least a portion of the training data may include messages sent or received by connected vehicles in a fleet.

The aggregation allows for defining fleetwide-relevant data based on multiple communications with and among connected vehicles in the fleet (i.e., communications between a vehicle and an external system or between vehicles). The fleetwide-relevant data may further be based on internal vehicle telemetries provided by each vehicle. To this end, each aggregated data point may indicate, but is not limited to, to, overall number of sensitive commands sent among connected vehicles in the fleet, overall number of sensitive events for the fleet, number of commands sent to a single vehicle, number of events received from a single vehicle, total number of error messages, and overall bandwidth usage, overall number of anomalous individual vehicle behaviors indicated in data collected from different vehicles or from external monitoring systems communicating with different vehicles, and overall number of normal vehicle behaviors.

The aggregation is defined by an aggregation rule including definitions for aspects of data such as, but not limited to, data sources (i.e., which sources to gather training data from), keys (i.e., which sets of attributes to group data by, for example such that all data of the aggregated data point shares each key in common), filters (i.e., which data should be filtered), aggregation functions (i.e., which mathematical function to use for aggregation), time period (i.e., a time period during which each subset of the training data is collected), a combination thereof, and the like. The aggregation rule may further define weights to be assigned to aggregated data points. For example, more recent data may be assigned higher weights than less recent data. The output of the aggregation is an aggregated data point which may be utilized for learning fleet behavioral profiles of the fleet. In an example implementation, the data aggregation process may be implemented using a scalable solution featuring a data aggregator as a service that can process incoming data in a partitioned manner to allow for scaling the service when high bandwidth of incoming data is received. Examples of aggregation definitions follow.

As a first example, an aggregation rule for aggregating data related to number of commands per vehicle may indicate incoming records as the data sources; vehicle identifier, and protocol as the keys; filtering to include only data where the type of the record is a command; an aggregation function of a counter; and a time period of one minute.

As a second example, an aggregation rule for aggregating data related to number of sensitive commands per vehicle may indicate incoming records as the data sources; vehicle identifier, and protocol as the keys; filtering to include only data where the type of the record is a sensitive command; an aggregation function of a counter; and a time period of one minute.

As a third example, an aggregation rule for aggregating data related to records bandwidth may indicate incoming records as the data sources; protocol as the keys; no filter; an aggregation function of summing the message sizes in bytes; and a time period of ten minutes.

In some implementations, the aggregated training data may be divided into a profile-building data set used for generating a fleet behavioral profile and a validation data set used for validating the generated fleet behavioral profile. The profile-building and validation data sets may overlap. As a non-limiting example, the validation data set may utilize training data collected during the last 2 weeks of a training period while the profile-building data set may utilize training data collected over the entire 10-week training period. In an example implementation, the training data is collected over a period of time such as, for example, 2 to 4 weeks, to allow sufficient data for learning fleetwide behavior. The time periods used for collecting and dividing the training data may be arbitrarily defined.

In an embodiment, S210 may include preprocessing the training data. The preprocessing may include, but is not limited to, normalization of the data, abstraction of the data, sequence analysis of the data, vehicle level anomaly detection, variable level analysis, a combination thereof, and the like. The variable-level analysis may be based on learned normal values of each variable such as, but not limited to, RPM, velocity, and the like. In an embodiment, S210 includes abstracting the training data as described in the above-referenced U.S. patent application Ser. No. 16/047,444, the contents of which are hereby incorporated by reference.

The abstraction allows for transforming data received as events and other messages among the training data into a unified format. In a further embodiment, the abstraction may be performed such that the abstraction of the training data includes only data that is relevant to the fleet or sub-fleet. Such fleetwide-relevant data may include, but is not limited to, sensitive commands sent among connected vehicles in the fleet, sensitive events for the fleet, commands sent to a single vehicle, events received from a single vehicle, error messages, internal vehicle telemetries (e.g., rotations per minute, engine state, etc.), abstraction of functional variable data (e.g., velocity, heading, etc.), and bandwidth usage measurements.

Abstracting the vehicle data allows for more efficient processing and anomaly detection. These benefits are compounded when data related to multiple connected vehicles in a fleet are abstracted since the total amount of data to be processed is reduced and data is ingested in a unified format that allows for more efficient comparisons. The abstracted data may also be clustered to allow for further increasing efficiency of processing.

In some implementations, the preprocessing may include sequence analysis of the data to provide sequences based on the training data. The sequences may be learned sequences identified in the training data and learned using machine learning based on previous sets of training data. The sequences, when learned, allow for associating particular inputs or types of inputs with expected outputs or types of outputs or vice versa. For example, a learned sequence may include "RPM>500 results in engine=started." The sequences may be organized with respect to channels, for example, a channel between a user device and a server or a channel between a server and a connected vehicle. The sequences may further include multi-channel sequences, for example, between a user device and a server and between the server and a connected vehicle. The sequences may be based on messages that are normalized into a uniform format.

At S220, the training data is used as inputs to one or more machine learning algorithms to generate one or more fleet behavioral profiles. If there are existing fleet behavioral profiles for the fleet, the existing fleet behavioral profiles may be updated to match the most recently generated profiles. In some implementations, the update fleet behavioral profiles may be published, for example, to a fleet behavioral profile repository. Each fleet behavioral profile is created with respect to one or more particular fleetwide-relevant parameters such that different profiles may be used for detection of different types of cyber threats.

In an embodiment, the generated fleet behavioral profiles include quantitative profiles and time-series profiles with respect to the fleetwide-relevant parameters. Each quantitative profile indicates normal behavior of one or a combination of fleetwide-relevant parameters during a discrete period of time. As a non-limiting example, receiving more than 300 sensitive commands from connected vehicles in a period of time may be anomalous when the quantitative profile indicates less than 300 sensitive commands received in previous discrete time periods. Each time-series profile indicates normal behavior of one or a combination of fleetwide-relevant parameters over time. As a non-limiting example, the average number of sensitive commands increasing over time may be anomalous when the time-series profile does not indicate such an increase over time. As another non-limiting example, 80% of vehicles in a fleet having their engines turned on at the same time may be anomalous when the average proportion of vehicles having their engines turned on at any given time is 30%.

In an embodiment, the generated fleet behavioral profiles are resilient to changes in numbers of vehicles in the fleet because the models are trained using fleetwide-relevant parameters including the numbers of vehicles in fleets at different points in time. To this end, the models may be trained such that normal behavior is defined with respect to a number of vehicles in the fleet.

In another embodiment, the training data is aggregated into aggregated data points as described herein above. Further, the aggregated data points may be assigned weights such that data points with higher weights may be given higher importance during training. As a non-limiting example, the aggregated data points may be aggregated with respect to periods of time and assigned weights such that more recent data points affect the training of the model more than less recent data points.

In yet another embodiment, any of the generated fleet behavioral profiles may be defined with respect to a sub-fleet. The sub-fleets may include particular groups of vehicles (e.g., manually defined groups), vehicles sharing one or more common traits (e.g., vehicles having the same make, vehicles having the same model, vehicles having the same make and model, autonomous vehicles, semi-autonomous or non-autonomous vehicles, etc.), and the like. In an example implementation, different profiles are created for connected vehicles that are autonomous vehicles than for other connected vehicles.

At optional S230, the generated fleet behavioral profiles may be validated. If the fleet behavioral profile fails validation, execution may continue at S210 where additional training data is received and a new fleet behavioral profile is generated. Alternatively, the generated fleet behavioral profile may be further refined until it passes validation.

As noted above, the training data may be divided into a profile-building data set and a validation data set, and the validation data set may be used for validating the profile. When the validation includes refining the fleet behavioral model, the weights of the machine learning algorithm applied to the profile-building data set may be tuned until the resulting refined fleet behavioral model does not produce more than a threshold number of anomalies when applied to the validation data set.

At S240, test data is aggregated. In an embodiment, S240 may include preprocessing the test data. The preprocessing may include, but is not limited to, normalization, abstraction, sequence analysis of the data, or a combination thereof, as described with respect to the training data at S210.

At S250, abnormal behavior is detected based on the test data. The detection includes detecting violations indicating abnormal behavior based on deviations from the fleet behavior profiles. As a non-limiting example, a violation has occurred when the current number of sensitive commands (i.e., in the test data) per hour is greater than the average number of sensitive commands per hour indicated in the fleet behavioral profile. As another example, a violation has occurred if the current bandwidth of records is more than twice as much as the average record bandwidth indicated in the fleet behavioral profile. As yet another example, a violation has occurred if the current set of aggregated data points is anomalous as compared to a time-series profile of the fleet.

At S260, mitigation actions may be performed when the abnormal behavior has been detected. The mitigation actions may include, but are not limited to, terminating communications, limiting communications within the fleet, allowing only certain types of communications, sending alerts, generating alerts to a dashboard for investigation, sending notifications to a third party device, and the like.

In an embodiment, the method of FIG. 2 may be performed recursively. More specifically, the learning phase 201, the enforcement phase 202, or both, may be performed iteratively as new training data and new test data, respectively, is received.

Figure 3:
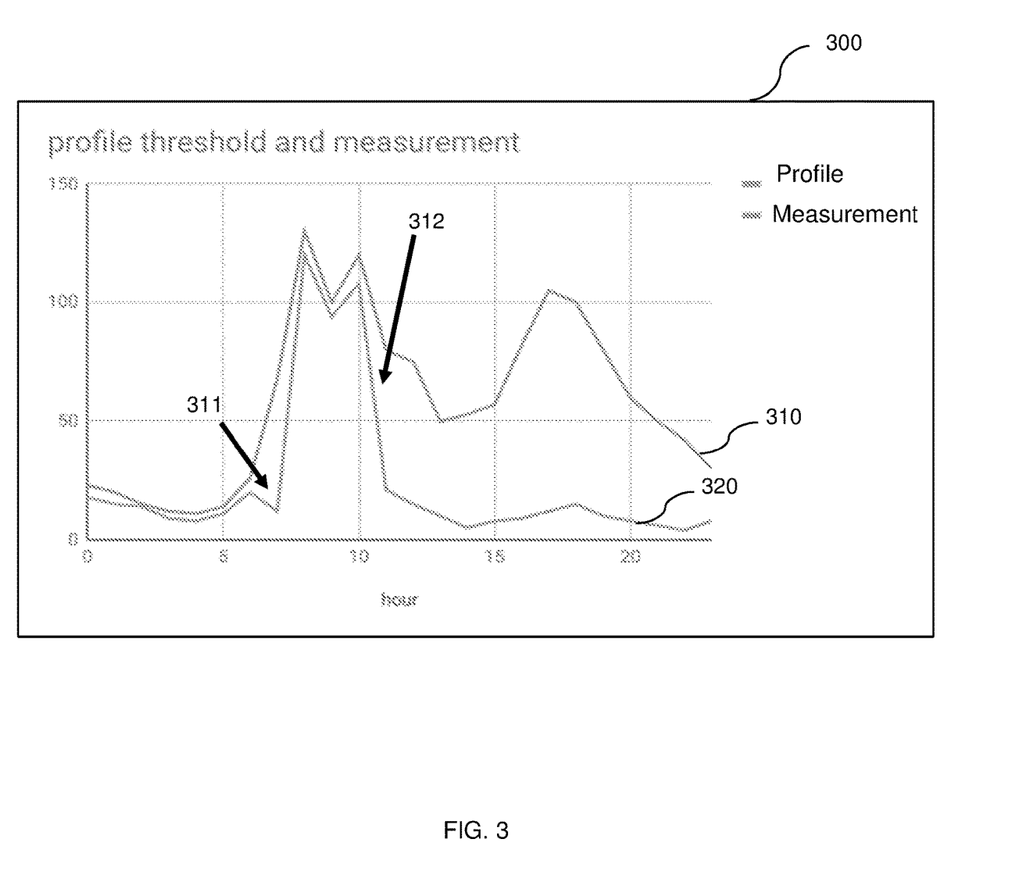
FIG. 3 is an example visual illustration of test data deviating from a fleet behavioral profile.

FIG. 3 is an example visual illustration 300 utilized to demonstrate a deviation from a time series fleet behavioral profile according to an embodiment. The visual illustration 300 includes lines 310 and 320 representing threshold values derived from a time-series fleet behavioral profile and actual measurements from test data, respectively. The actual measurements deviate from the fleet behavioral profile above a threshold around points 311 and 312. Based on these deviations, anomalous fleet behavior is detected.

FIG. 4 is an example schematic diagram of a fleet anomaly detector 130 according to an embodiment. The fleet anomaly detector 130 includes a processing circuitry 410 coupled to a memory 420, a storage 430, and a network interface 440. In an embodiment, the components of the fleet anomaly detector 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein. Specifically, the instructions, when executed, cause the processing circuitry 410 to generate fleet behavior models and detect anomalous behavior in fleets or sub-fleets as described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the fleet anomaly detector 130 to communicate with the security agent 140 for the purpose of, for example, receiving events, sending commands to be implemented by the fleet manager 160 or the VCSs 170, and the like. Further, the network interface 440 allows the fleet anomaly detector 130 to communicate with the data sources 180 for the purpose of collecting vehicle data.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting behavioral anomalies among a fleet including a plurality of connected vehicles, comprising:
   generating at least one fleet behavioral profile for the fleet using a first set of data, wherein creating each fleet behavioral profile includes training a machine learning model using at least a portion of the first set of data, wherein the at least a portion of the first set of data relates to communications with and among the plurality of connected vehicles and includes a number of vehicles in the fleet at different points in time, wherein each fleet behavioral profile is a model of normal fleet behavior;
   applying the at least one fleet behavioral profile to detect at least one anomaly in a second set of data for the fleet, wherein the second set of data includes data related to communications with and among the plurality of connected vehicles; and
   performing at least one mitigation action when the at least one anomaly is detected.

2. The method of claim 1, further comprising:
   aggregating each of the first set of data and the second set of data based on an aggregation definition, wherein the aggregation definition indicates at least one data source, at least one key, at least one filter, an aggregation function, and a time period, wherein each of the at least one key is a plurality of attributes to group data by, wherein aggregating each of the first set of data and the second set of data includes aggregating portions of the first set of data and the second set of data sharing each key in common.

3. The method of claim 2, wherein each of the aggregated first set of data and the aggregated second set of data includes at least one aggregated data point, wherein each aggregated data point is any of: number of commands indicated in a record as having a type sensitive command that are sent among the plurality of connected vehicles, number of commands indicated in a record as having a type sensitive command that are sent to and from any of the plurality of connected vehicles, number of events indicated in a record as having a type sensitive for the fleet, number of commands sent to each of the plurality of connected vehicles, number of events received from each of the plurality of connected vehicles, total number of error messages, a number of connected vehicles in the fleet, and overall bandwidth usage.

4. The method of claim 1, further comprising:
   preprocessing the first set of data, wherein preprocessing the first set of data further comprises:
   abstracting the first set of data, wherein abstracting the first set of data includes transforming at least one event of the first set of data into a unified format.

5. The method of claim 1, wherein the at least one fleet behavioral profile includes at least one of: a quantitative profile indicating normal fleet behavior during a discrete period of time, and a time-series profile indicating normal fleet behavior over time.

6. The method of claim 1, wherein at least one of the at least one fleet behavioral profile is defined with respect to a sub-fleet, wherein the sub-fleet includes a portion of the plurality of connected avehicles.

7. The method of claim 1, further comprising:
   determining a profile-building data set and a validation data set from among the first set of data; and
   validating the at least one fleet behavioral profile by applying each fleet behavioral profile to the validation data set to detect a number of anomalies, wherein each fleet behavioral profile is validated when a number of anomalies detected using the fleet behavioral profile when applied to the validation data set does not exceed a threshold.

8. The method of claim 1, wherein the plurality of connected vehicles includes a plurality of autonomous vehicles, wherein the detected at least one anomaly includes at least one of: a fleet level anomaly in behavior of the plurality of autonomous vehicles, and a sub-fleet level anomaly in behavior of a portion of the plurality of autonomous vehicles.

9. The method of claim 1, wherein the at least one mitigation action includes at least one of: terminating communications among the plurality of connected vehicles, terminating communications to and from at least one of the plurality of connected vehicles, terminating communications between any of the connected vehicles and at least one server, generating an alert to a dashboard, sending an alert to an external system, and denying at least one type of communication among the fleet.

10. The method of claim 1, wherein the at least one anomaly is detected with respect to at least one of: aggregation of similar or related anomalies in individual vehicle behavior detected based on data collected from across different vehicles of the plurality of connected vehicles, aggregation of similar or related anomalies in individual vehicle behavior detected by external vehicle monitoring systems communicating with the plurality of connected vehicles, aggregation of similar or related anomalies in individual vehicle behavior detected by internal vehicle monitoring systems of the plurality of connected vehicles, and aggregation of similar or related normal individual vehicle behavior among the plurality of connected vehicles.

11. A non-transitory computer readable medium having stored thereon instructions for causing a processing circuitry to execute a process, the process comprising:
   generating at least one fleet behavioral profile for the fleet using a first set of data, wherein creating each fleet behavioral profile includes training a machine learning model using at least a portion of the first set of data, wherein the at least a portion of the first set of data relates to communications with and among a plurality of connected vehicles and includes a number of vehicles in the fleet at different points in time, wherein each fleet behavioral profile is a model of normal fleet behavior;
   applying the at least one fleet behavioral profile to detect at least one anomaly in a second set of data for the fleet, wherein the second set of data includes data related to communications with and among the plurality of connected vehicles; and performing at least one mitigation action when the at least one anomaly is detected.

12. A system for detecting behavioral anomalies among a fleet including a plurality of connected vehicles, comprising:

a processing circuitry; and a memory, the memory containing instructions that, when executed by the processing circuitry, configure the system to:

generate at least one fleet behavioral profile for the fleet using a first set of data, wherein creating each fleet behavioral profile includes training a machine learning model using at least a portion of the first set of data, wherein the at least a portion of the first set of data relates to communications with and among the plurality of connected vehicles and includes a number of vehicles in the fleet at different points in time, wherein each fleet behavioral profile is a model of normal fleet behavior;

apply the at least one fleet behavioral profile to detect at least one anomaly in a second set of data for the fleet, wherein the second set of data includes data related to communications with and among the plurality of connected vehicles; and perform at least one mitigation action when the at least one anomaly is detected.

13. The system of claim 12, wherein the system is further configured to:

aggregate each of the first set of data and the second set of data based on an aggregation definition, wherein the aggregation definition indicates at least one data source, at least one key, at least one filter, an aggregation function, and a time period, wherein each of the at least one key is a plurality of attributes to group data by, wherein aggregating each of the first set of data and the second set of data includes aggregating portions of the first set of data and the second set of data sharing each key in common.

14. The system of claim 13, wherein each of the aggregated first set of data and the aggregated second set of data includes at least one aggregated data point, wherein each aggregated data point is any of: number of commands indicated in a record as having a type sensitive command that are sent among the plurality of connected vehicles, number of commands indicated in a record as having a type sensitive command that are sent to and from any of the plurality of connected vehicles, number of events indicated in a record as having a type sensitive for the fleet, number of commands sent to each of the plurality of connected vehicles, number of events received from each of the plurality of connected vehicles, total number of error messages, a number of connected vehicles in the fleet, and overall bandwidth usage.

15. The system of claim 12, wherein the system is further configured to:

preprocess the first set of data; and abstract the first set of data, wherein abstracting the first set of data includes transforming at least one event of the first set of data into a unified format.

16. The system of claim 12, wherein the at least one fleet behavioral profile includes at least one of: a quantitative profile indicating normal fleet behavior during a discrete period of time, and a time-series profile indicating normal fleet behavior over time.

17. The system of claim 12, wherein at least one of the at least one fleet behavioral profile is defined with respect to a sub-fleet, wherein the sub-fleet includes a portion of the plurality of connected vehicles.

18. The system of claim 12, wherein the system is further configured to:

determine a profile-building data set and a validation data set from among the first set of data; and validate the at least one fleet behavioral profile by applying each fleet behavioral profile to the validation data set to detect a number of anomalies, wherein each fleet behavioral profile is validated when a number of anomalies detected using the fleet behavioral profile when applied to the validation data set does not exceed a threshold.

19. The system of claim 12, wherein the plurality of connected vehicles includes a plurality of autonomous vehicles, wherein the detected at least one anomaly includes at least one of: a fleet level anomaly in behavior of the plurality of autonomous vehicles, and a sub-fleet level anomaly in behavior of a portion of the plurality of autonomous vehicles.

20. The system of claim 12, wherein the at least one mitigation action includes at least one of: terminating communications among the plurality of connected vehicles, terminating communications to and from at least one of the plurality of connected vehicles, terminating communications between any of the connected vehicles and at least one server, generating an alert to a dashboard, sending an alert to an external system, and denying at least one type of communication among the fleet.

21. The system of claim 12, wherein the at least one anomaly is detected with respect to at least one of: aggregation of similar or related anomalies in individual vehicle behavior detected based on data collected from across different vehicles of the plurality of connected vehicles, aggregation of similar or related anomalies in individual vehicle behavior detected by external vehicle monitoring systems communicating with the plurality of connected vehicles, aggregation of similar or related anomalies in individual vehicle behavior detected by internal vehicle monitoring systems of the plurality of connected vehicles, and aggregation of similar or related normal individual vehicle behavior among the plurality of connected vehicles.

* * * * *